US009862262B2

(12) United States Patent
Martin et al.

(10) Patent No.: US 9,862,262 B2
(45) Date of Patent: Jan. 9, 2018

(54) HYBRID VEHICLE POWERTRAIN

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 14/814,055

(22) Filed: Jul. 30, 2015

(65) Prior Publication Data

US 2017/0028836 A1    Feb. 2, 2017

(51) Int. Cl.

| B60K 6/50  | (2007.10) |
| B60K 6/445 | (2007.10) |
| B60K 6/24  | (2007.10) |
| B60K 6/365 | (2007.10) |
| F16H 3/72  | (2006.01) |
| B60W 10/04 | (2006.01) |
| B60W 10/06 | (2006.01) |

(Continued)

(52) U.S. Cl.
CPC .................. *B60K 6/50* (2013.01); *B60K 6/24* (2013.01); *B60K 6/365* (2013.01); *B60K 6/445* (2013.01); *B60W 10/04* (2013.01); *B60W 10/06* (2013.01); *B60W 10/08* (2013.01); *B60W 20/11* (2016.01); *F02B 63/042* (2013.01); *F16H 3/724* (2013.01); *F16H 3/727* (2013.01); *B60W 2510/0638* (2013.01); *B60W 2510/081* (2013.01); *B60W 2510/244* (2013.01); *B60W 2520/10* (2013.01); *B60W 2540/10* (2013.01); *B60W 2710/09* (2013.01); *B60W 2710/105* (2013.01); *B60W 2720/30* (2013.01); *B60Y 2200/92* (2013.01); *B60Y 2300/20* (2013.01); *B60Y 2300/43* (2013.01); *B60Y 2300/60* (2013.01); *B60Y 2400/431* (2013.01); *B60Y 2400/435* (2013.01); *B60Y 2400/73* (2013.01); *F02B 41/10* (2013.01); *F02B 61/06* (2013.01); *Y02T 10/166* (2013.01); *Y02T 10/6295* (2013.01); *Y10S 903/905* (2013.01); *Y10S 903/91* (2013.01); *Y10S 903/915* (2013.01); *Y10S 903/93* (2013.01)

(58) Field of Classification Search
None
See application file for complete search history.

(56) References Cited

U.S. PATENT DOCUMENTS

| 4,856,377 A | 8/1989 | Goundreau et al. |
| 4,864,151 A | 9/1989 | Wyczalek et al.  |

(Continued)

OTHER PUBLICATIONS

Leone, T., "Systems and Methods for Control of Turbine-Generator Via Valve Deactivation in a Split Exhaust Engine System," U.S. Appl. No. 14/537,697, filed Nov. 10, 2014, 51 pages.

(Continued)

*Primary Examiner* — Jacob S Scott
(74) *Attorney, Agent, or Firm* — Julia Voutyras; McCoy Russell LLP (57) ABSTRACT

Methods and systems for delivering powertrain torque of a hybrid vehicle are disclosed. In one example, torque is supplied to vehicle wheels from a piston engine, an electric machine, and a turbine engine via a planetary gear set. The planetary gear set may be configured with at least one sun gear and two ring gears.

17 Claims, 5 Drawing Sheets

(51) Int. Cl.
*B60W 10/08* (2006.01)
*F02B 41/10* (2006.01)
*F02B 61/06* (2006.01)
*B60W 20/11* (2016.01)
*F02B 63/04* (2006.01)

(56) References Cited

U.S. PATENT DOCUMENTS

| | | | |
|---|---|---|---|
| 4,872,311 A | 10/1989 | Sturm | |
| 4,884,407 A * | 12/1989 | Hatanaka | F02B 37/005 60/614 |
| 4,989,410 A * | 2/1991 | Smith | F02B 37/105 60/607 |
| 5,012,906 A | 5/1991 | Meyer et al. | |
| 5,033,269 A * | 7/1991 | Smith | F02B 37/105 60/607 |
| 5,853,345 A | 12/1998 | Park | |
| 5,931,757 A | 8/1999 | Schmidt | |
| 6,169,332 B1 | 1/2001 | Taylor et al. | |
| 6,460,337 B1 | 10/2002 | Olofsson | |
| 6,553,977 B2 | 4/2003 | Schmitz | |
| 6,595,183 B1 | 7/2003 | Olofsson | |
| 7,364,526 B2 | 4/2008 | Cho | |
| 7,490,594 B2 | 2/2009 | Van Dyne et al. | |
| 8,069,663 B2 | 12/2011 | Ulrey et al. | |
| 8,070,638 B2 | 12/2011 | Phillips | |
| 8,091,357 B2 | 1/2012 | Robel | |
| 8,364,378 B2 | 1/2013 | De Graaff et al. | |
| 8,432,048 B1 | 4/2013 | Paulino et al. | |
| 8,479,511 B2 | 7/2013 | Pursifull et al. | |
| 8,511,084 B2 | 8/2013 | Ulrey et al. | |
| 8,539,770 B2 | 9/2013 | Williams | |
| 8,601,811 B2 | 12/2013 | Pursifull et al. | |
| 8,653,677 B2 | 2/2014 | West | |
| 8,701,409 B2 | 4/2014 | Pursifull et al. | |
| 8,739,527 B2 | 6/2014 | Ulrey et al. | |
| 2008/0171625 A1 | 6/2008 | Goldschmidt et al. | |
| 2012/0137681 A1* | 6/2012 | Hoess | B60K 6/48 60/607 |
| 2012/0228040 A1 | 9/2012 | Kyle | |
| 2013/0174544 A1* | 7/2013 | Valetutti | F02G 5/02 60/598 |
| 2015/0285161 A1* | 10/2015 | Ulrey | F02D 21/04 477/3 |
| 2016/0016577 A1* | 1/2016 | Holmes | B60W 10/08 701/22 |
| 2016/0017793 A1* | 1/2016 | Johnson | F02B 39/10 417/44.1 |
| 2016/0319734 A1* | 11/2016 | Milanovic | F02B 41/10 |

OTHER PUBLICATIONS

Ulrey, J. et al., "System and Methods for Control of Turbine-Generator Via Exhaust Valve Timing and Duration Modulation in a Split Exhaust Engine System," U.S. Appl. No. 14/537,722, filed Nov. 10, 2014, 58 pages.

Martin, D. et al., "Engine Exhaust Temperature Control," U.S. Appl. No. 14/746,616, filed Jun. 22, 2015, 39 pages.

Hamid, S. et al. "Divided Exhaust Period—A Gas Exchange System for Turbocharged SI Engines," SAE Technical Paper Series No. 2005-01-1150, 2005 SAE World Congress, Detroit, Michigan, Apr. 11-14, 2005, 14 pages.

Roth, D. et al. "Valve-Event Modulated Boost System, " SAE Technical Paper Series No. 2010-01-1222, Copyright 2010 SAE International, Apr. 12, 2010, 16 pages.

Roth, D. et al. "Valve-Event Modulated Boost System: Fuel Consumption and Performance with Scavenge-Sourced EGR," SAE Technical Paper Series No. 2012-01-0705, Copyright 2012 SAE International, Apr. 16, 2012, 9 pages.

Hu, B. et al. "1-D Simulation Study of Divided Exhaust Period for a Highly DownsizedTurbocharged SI Engine—Scavenge Valve Optimization, " SAE Technical Paper Series No. 2014-01-1656, Copyright 2014 SAE International, Apr. 1, 2014, 10 pages.

Haughton, A. et al. "Development of an Exhaust Driven Turbine-Generator Integrated Gas Energy Recovery System (TIGERS®)," SAE Technical Paper Series No. 2014-01-1873, Copyright 2014 SAE International, Apr. 1, 2014, 8 pages.

* cited by examiner

FIG. 5

HYBRID VEHICLE POWERTRAIN

BACKGROUND/SUMMARY

A hybrid vehicle powertrain may deliver torque to propel a vehicle via a piston engine or an electric machine. The electric machine may be beneficial to reduce vehicle fuel consumption during vehicle launch from zero speed or a low speed to a higher speed. The piston engine may be activated when higher torque demands are requested and to increase the vehicle's driving range. Nevertheless, operating the piston engine may not be desirable during conditions where a traction motor is capable of providing nearly as much torque as is desired because the piston engine is less efficient than a traction motor. Further, although it may be possible to provide additional electric machines to increase driveline torque and delay piston engine starting, the cost of additional electric machines may be prohibitive. Additionally, it may be increasingly difficult to provide smooth powertrain torque when multiple torque sources are combined.

The inventors herein have recognized the above-mentioned disadvantages and have developed a hybrid vehicle powertrain, comprising: a piston engine; an electric machine; a turbine engine located along an exhaust passage of the piston engine; and a planetary gear set mechanically coupled to the piston engine, the electric machine, and the turbine engine.

By combining torque from an electric machine, the piston engine, and the turbine engine and delivering the torque via a planetary gear set, it may be possible to provide the technical result of providing various levels of powertrain torque. Further, the torque may be provided in a smooth progressive manner without having to have to provide sophisticated clutch torque control. Additionally, the turbine engine may be incorporated as part of a turbocharger to decrease system cost and complexity.

The present description may provide several advantages. In particular, the approach may provide smooth powertrain torque from a plurality of torque sources. Additionally, the approach may provide for additional levels of powertrain torque production. Further, the approach may eliminate the need for complex clutch control algorithms.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
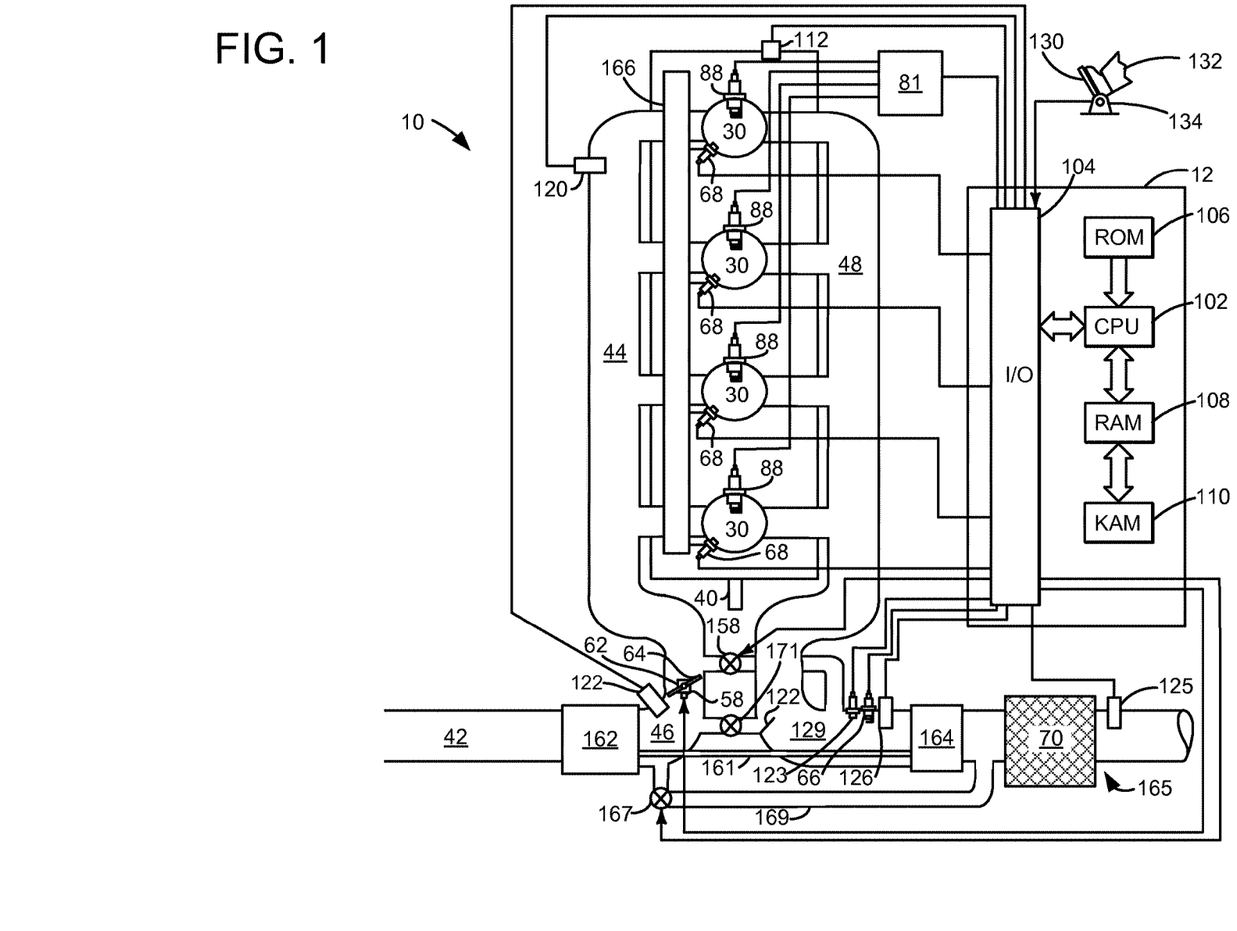
FIG. 1 shows a schematic depiction of an engine.
Figure 2A:
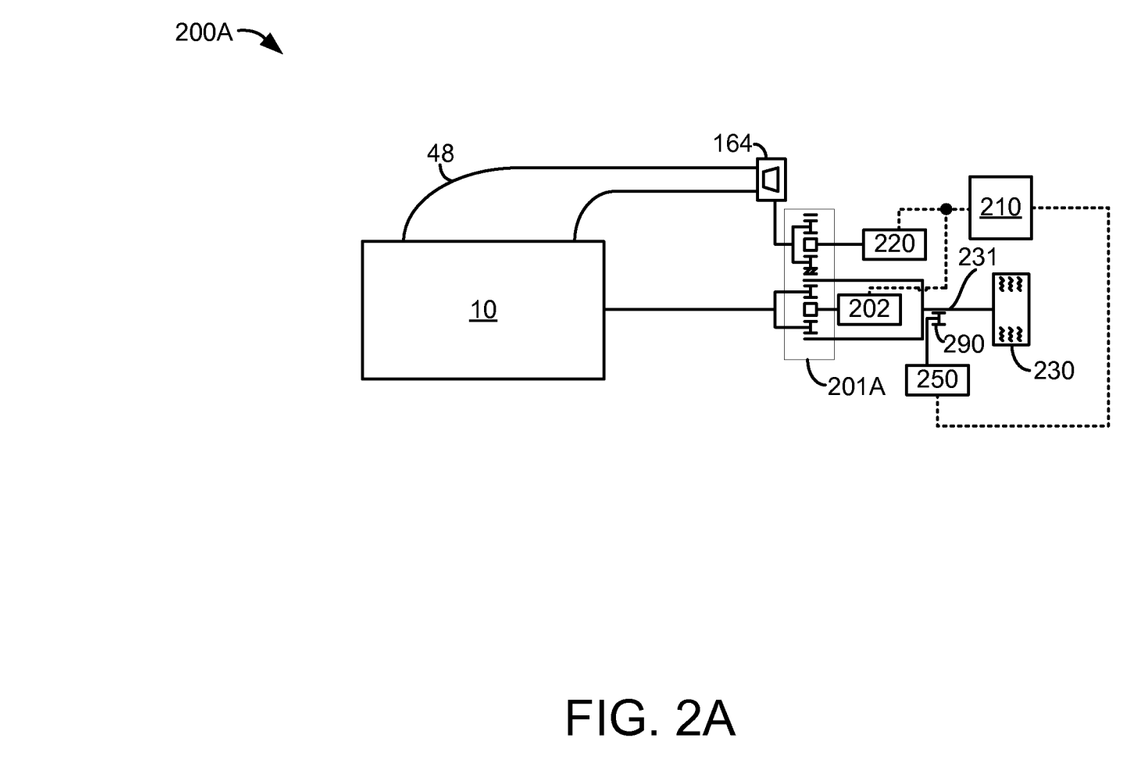
FIGS. 2A-2B show example powertrain configurations that include planetary gear sets.
Figure 2B:
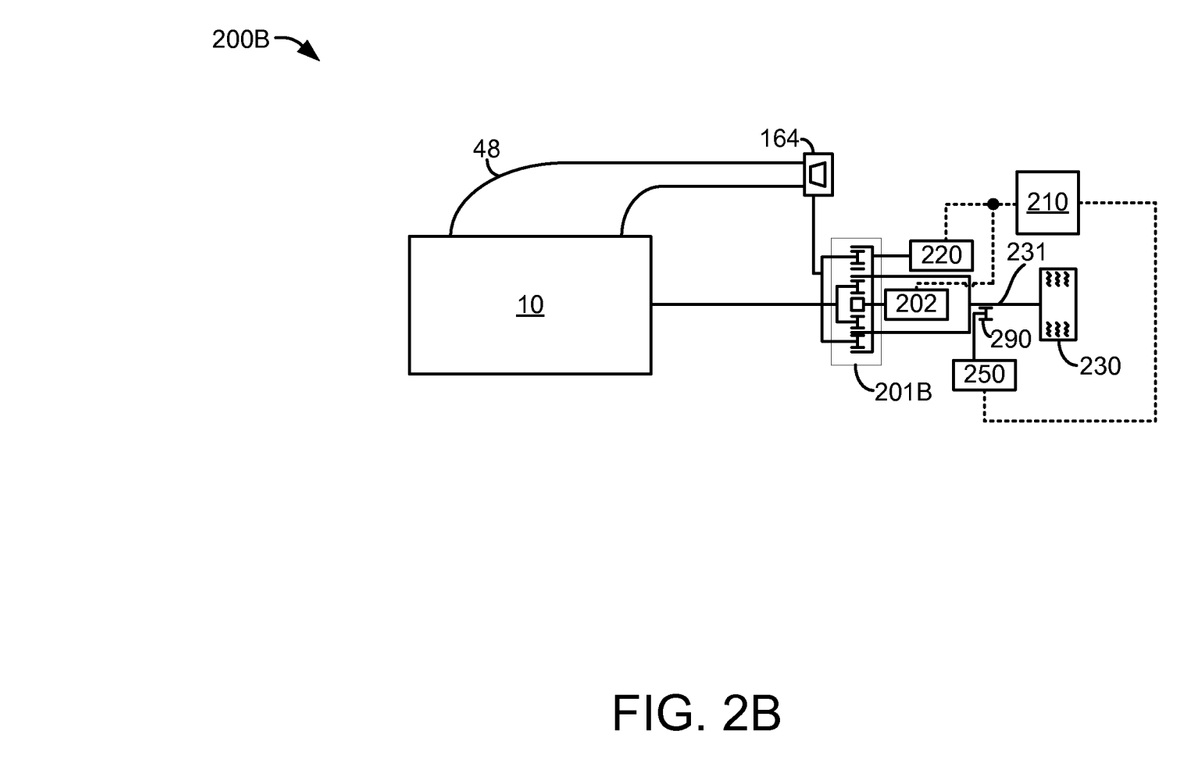
Figure 3:
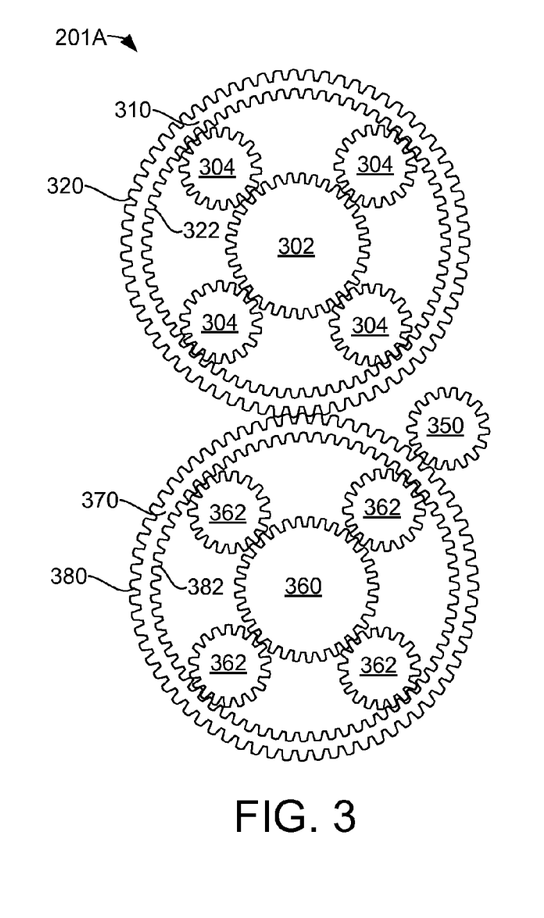
FIGS. 3 and 4 show example planetary gear sets for the powertrains shown in FIGS. 2A and 2B.
Figure 4:
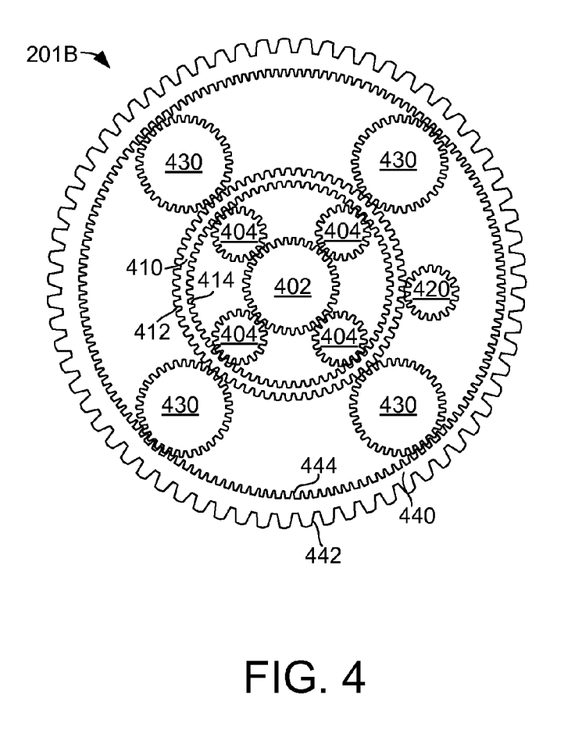
Figure 5:
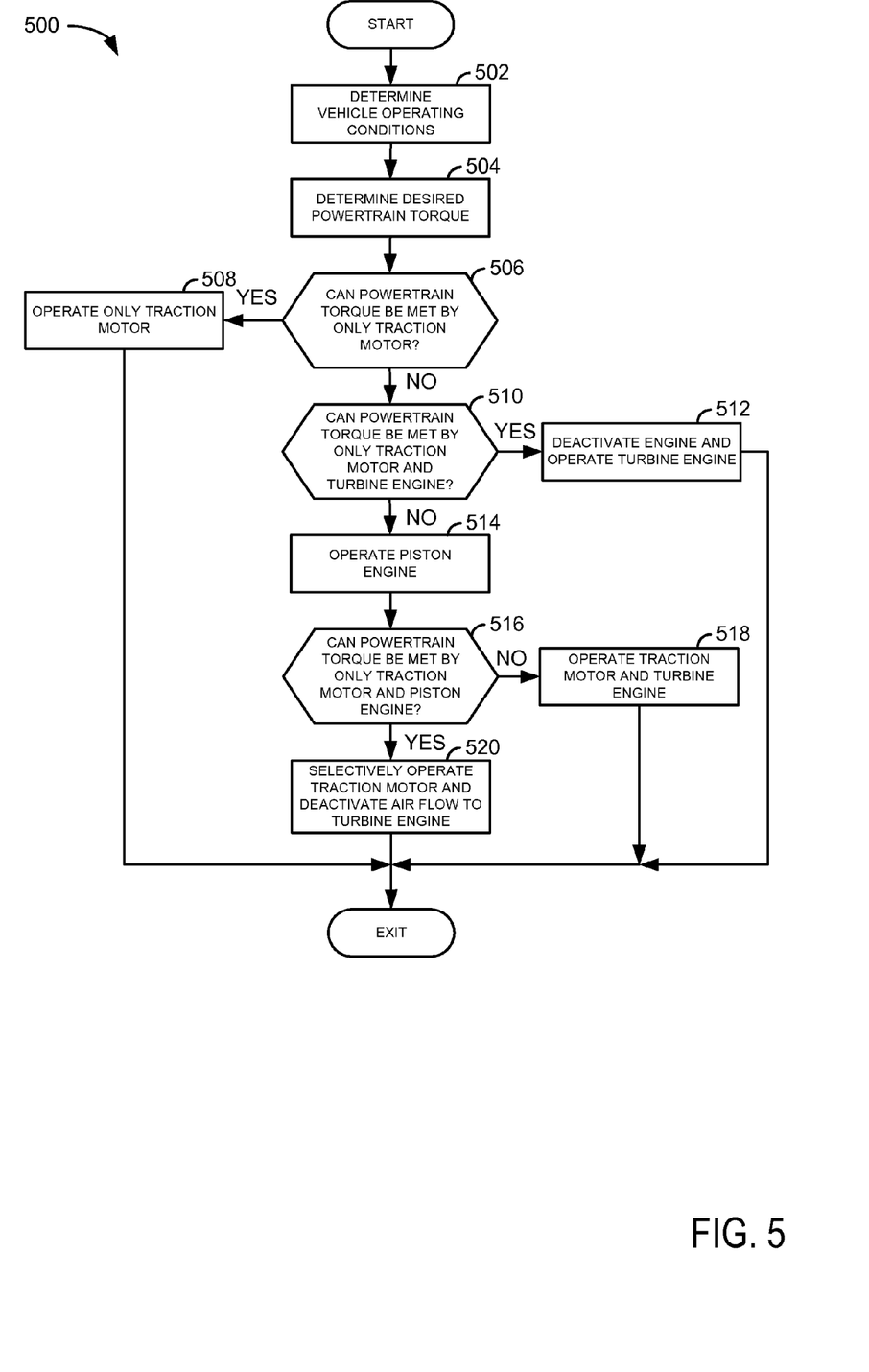
FIG. 5 is an example method for operating a powertrain.

The present description is related to operating a hybrid vehicle. The hybrid vehicle may include a piston engine as is shown in FIG. 1. The piston engine may be incorporated into a powertrain as shown in FIGS. 2A and 2B to provide torque to vehicle wheels. The powertrain may include a planetary gear set for combining torque from a plurality of torque sources as shown in FIGS. 3 and 4. A method for operating the powertrain is shown in FIG. 5.

Referring to FIG. 1, internal combustion engine 10, comprising a plurality of cylinders 30, is controlled by electronic engine controller 12. Engine 10 may be a Miller cycle engine where compressed air is provided to engine intake manifold 44 and where intake valves close after bottom dead center intake stroke so that a portion of cylinder contents are expelled to intake manifold 44 during the engine's compression stroke. Engine 10 includes cylinders 30 including pistons (not shown) therein and connected to crankshaft 40. Crankshaft 40 selectively supplies torque to vehicle wheels (not shown). Cylinders 30 are shown communicating with intake manifold 44 and exhaust manifold 48 via respective intake valves and exhaust valves (not shown). Each intake and exhaust valve may be operated by a cam (not shown).

Fuel injectors 68 are shown positioned to inject fuel directly into combustion chambers 30, which is known to those skilled in the art as direct injection. Fuel injectors 68 deliver fuel in proportion to a pulse width from controller 12. Fuel is delivered to fuel injectors 68 by a fuel system including a fuel tank (not shown), fuel pump (not shown), and fuel rail 166.

Ignition system 81 supplies electrical energy to spark plugs 88 in response to pulse widths of a signal provided by controller 12. Each spark plug 88 may be operated independently of the remaining spark plugs.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided and compressor 162 may be driven via a motor or crankshaft 40 instead of turbine 164. Turbine 164 may include variable vanes such that exhaust gases may pass through turbine 164 supplying little energy to rotate turbine 164 when vanes are in an open position. Exhaust gases may pass through turbine 164 and impart increased force on turbine 164 when vanes are in a closed position.

Combustion is initiated in cylinders 30 when fuel ignites via spark plugs 88. In some examples, a universal Exhaust Gas Oxygen (UEGO) sensor 126 may be coupled to exhaust manifold 48 upstream of emissions device 70 (e.g., three-way catalyst). In other examples, the UEGO sensor may be located downstream of one or more exhaust after treatment devices. Further, in some examples, the UEGO sensor may be replaced by a NOx sensor that has both NOx and oxygen sensing elements. Additionally, an oxygen sensor 125 is positioned downstream from emissions device 70.

Exhaust gas recirculation (EGR) may be provided to the engine via EGR valve 158. EGR valve 158 may be selectively opened and closed to allow exhaust gases to flow from exhaust manifold 48 to intake manifold 44 when intake manifold pressure is less than exhaust manifold pressure.

Compressed air may be supplied from compressor 162 to exhaust passage 165 at a location downstream of turbine 164 and upstream of emissions device 70 via post-turbine boost air flow control valve 167 and passage 169. Exhaust passage 165 carries exhaust gas from exhaust manifold 48 to atmosphere.

The system also includes fuel injector 123 for injecting fuel into exhaust passage 165 for combusting in turbine 164, which allows turbine 164 to operate as a turbine engine. Fuel may be injected via injector 123 in response to a temperature of an exhaust system component (e.g., vanes of turbine 164) being greater than a component degradation threshold temperature or in response to a torque demand (e.g., a driver demand torque). Engine 10 may be operated at lean best torque (e.g., (LBT), a leanest engine air-fuel ratio that is rich of stoichiometry that produces best engine torque at an engine speed, load, and knock limited spark timing) when injector 123 is activated.

Alternatively, fuel may be injected via injector 123 without engine 10 being activated. Additionally, air flow through post-turbine boost air flow control valve 167 may be adjusted to provide a stoichiometric exhaust gas mixture in exhaust passage 165 upstream of emissions device 70 and downstream of turbine 164. In one example, air flow through post-turbine boost air flow control valve 167 is adjusted to an open loop position based on fuel injected to engine 10, fuel injected to exhaust passage 165, and air flow through engine 10. The open loop position of valve 167 is further adjusted in response to post emissions control device oxygen sensor 125.

For example, if oxygen sensor 125 indicates rich exhaust gases, post-turbine boost air flow control valve 167 opening amount is increased to provide stoichiometric exhaust gases at oxygen sensor 125. In this way, the system of FIG. 1 provides for reducing exhaust component temperatures while providing higher catalyst efficiency and/or operating turbine 164 as a turbine engine.

The system of FIG. 1 also includes a pre-turbine boost air flow control valve 171. Valve 171 selectively allows air to flow from boost chamber 46 to exhaust passage 165. Compressor 162 may pressurize air at higher pressures than pressure of exhaust in exhaust passage 165. In one example, an open loop opening amount of valve 171 is based on requested turbine engine torque. Further, the position of valve 171 may be adjusted in response to output of oxygen sensor 126 to provide a desired air-fuel ratio at an inlet of turbine 164.

The system of FIG. 1 may also include an optional additional spark plug 66 in exhaust passage 165 and flapper valve 122. Spark plug 66 may be activated to ignite a fuel and air mixture provided to expansion chamber 129 via fuel injector 123 and pre-turbine boost air flow control valve 171. The ignited air and fuel expands in turbine 164 to provide torque to vehicle the vehicle powertrain shown in detail in FIGS. 3 and 4.

Turbine 164 may be operated in response to driver demand torque or in select modes including but not limited to cruise control and maximum power modes. In cruise control mode, turbine 164 may be operated while engine 10 stops rotating. Turbine 164 may be activated in cruise mode at selected vehicle speeds where turbine 164 operates at greater than a threshold efficiency. During maximum power mode, turbine 164 may be activated to augment engine power to increase drivetrain output. Turbine 164 may be activated as a turbine engine by supplying fuel and/or air upstream of turbine 164. Rich exhaust gases in expansion chamber 129 may combust in the presence of air supplied by valve 171 and expand in turbine 164.

Flapper valve 122 reduces the possibility of excess exhaust back pressure and backflow into boost chamber 46. Expansion chamber 129 allows exhaust gases to expand so that air may pass from boost chamber 46 to expansion chamber 129 at lower boost pressures. In systems not including a spark plug in exhaust passage 165, the air and fuel exhaust gas mixture may be ignited via retarding engine spark timing. Further, in some examples, fresh air that does not participate in combustion in cylinders 30 may pass through cylinders 30 during intake and exhaust valve overlap (e.g., blow-through) so that valve 171 may be omitted.

During modes where turbine 164 is activated by igniting an air and fuel mixture in expansion chamber 129, rich exhaust gases are provided to turbine 164. Pre-turbine boost air flow control valve 171 is opened to provide a desired air flow based on turbine speed and driver demand torque to turbine 164. Fuel injected via injector 123 may also be based on turbine speed and driver demand torque.

Controller 12 is shown in FIG. 1 as a conventional microcomputer including: microprocessor unit 102, input/output ports 104, read-only memory 106 (non-transitory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112; a position sensor 134 coupled to an accelerator pedal 130 for sensing accelerator position adjusted by driver 132; a measurement of engine manifold pressure (MAP) from pressure sensor 120 coupled to intake manifold 44; boost pressure from pressure sensor 122; exhaust gas oxygen concentration from oxygen sensor 126; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke of a cylinder 30, generally, an exhaust valve closes and intake valve opens. Air is introduced into cylinder 30 via intake manifold 44, and a piston moves to the bottom of the cylinder so as to increase the volume within cylinder 30. The position at which the piston is near the bottom of the cylinder and at the end of its stroke (e.g., when cylinder 30 is at its largest volume) is typically referred to by those of skill in the art as bottom dead center (BDC). During the compression stroke, the intake valve and the exhaust valve are closed. A piston in cylinder 30 moves toward the cylinder head so as to compress the air within cylinder 30. The point at which the piston is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by spark plug 88 resulting in combustion. During the expansion stroke, the expanding gases push the piston back to BDC. Crankshaft 40 converts piston movement into a rotational torque of the rotary shaft. Finally, during the exhaust stroke, the exhaust valve opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Air flow through engine 10 begins at intake 42 and proceeds to compressor 162. Air exits compressor 162 entering boost chamber 46 before proceeding to intake manifold 44. The air then flows though cylinders 30 before exiting as exhaust gas after participating in combustion. Exhaust gases enter exhaust manifold 48 before proceeding to turbine 164. Exhaust gases exit turbine 164 and enter emissions device 70 before being released to atmosphere. Thus, intake 42 is located upstream of emissions device 70 based on a direction of flow through engine 10.

If the system of FIG. 1 is operated at higher speeds and loads where a temperature of an exhaust system component (e.g., vanes of turbine 164) is greater than a component degradation threshold temperature, the engine is transitioned from operating the engine with stoichiometric air-fuel ratios to operating the engine with air and fuel mixtures rich of stoichiometry to reduce temperatures of exhaust system components. The component degradation threshold temperature represents a temperature where exhaust component degradation may occur if the exhaust system component is above the component degradation threshold temperature for a predetermined amount of time. The rich engine air-fuel ratio increases heat transfer out of the engine and reduces combustion temperatures. The post-turbine boost air flow control valve is opened in response to a temperature of an exhaust system component (e.g., vanes of turbine 164) being greater than the component degradation threshold temperature. In one example, air flow through post-turbine boost air flow control valve 167 is commanded to an open loop position based on engine fuel flow, engine air mass flow, and the amount of fuel injected to exhaust passage 165. The open loop valve position is then adjusted responsive to oxygen sensor 125 to provide stoichiometric exhaust gases entering emissions control device 70.

Referring now to FIG. 2A, a first example powertrain 200A is shown. Devices and mechanical connections are shown via solid lines. Electrical connections are shown via dotted lines.

Engine 10 of FIG. 1 is shown with exhaust manifold 48 in fluidic communication with turbine 164. Engine 10 is also shown mechanically coupled to planetary gear set 201A at planetary gears 362 shown in FIG. 3 so that engine torque may be transferred to planetary gear set 201A. Turbine 164 is mechanically coupled to planetary gear set 201A. Turbine 164 is mechanically coupled to planetary gears 304 shown in FIG. 3 so that turbine 164 may transfer torque to planetary gear set 201A. Motor/generator 220 is shown mechanically coupled to sun gear 302 shown in FIG. 3 so that motor/generator 220 may receive power from turbine 164 when turbine 164 is operated as a turbine engine. Motor/generator 220 may spin sun gear 302 to provide torque to planetary gear set 201A. Motor/generator 220 is also shown in electrical communication with electric energy storage device 210.

A second motor/generator 202 is shown mechanically coupled to planetary gear set 201A at sun gear 360 shown in FIG. 3 so that torque from second motor/generator 202 may be supplied to planetary gear set 201A. Second motor/generator 202 is in electrical communication with electric storage device 210. Traction motor 250 is shown mechanically coupled to powertrain 200A and planetary gear set 201A via gear set 290. Traction motor 250 is also in electrical communication with electric storage device 210. Planetary gear set 201A and traction motor 250 deliver torque to vehicle wheels via shaft 231. Thus, planetary gear set 201A allows piston engine 10, turbine engine 164, first motor/generator 220, and second motor/generator 202 to be mechanically coupled without clutches. However, in some examples at least one of the motor/generators may be selectively clutched to powertrain 200A.

Referring now to FIG. 2B, a second example powertrain 200B is shown. Devices and mechanical connections are shown via solid lines. Electrical connections are shown via dotted lines.

Engine 10 of FIG. 1 is shown with exhaust manifold 48 in fluidic communication with turbine 164. Engine 10 is also shown mechanically coupled to planetary gear set 201B at planetary gears 404 shown in FIG. 4 so that engine torque may be transferred to planetary gear set 201B. Turbine 164 is mechanically coupled to planetary gear set 201B. Turbine 164 is mechanically coupled to planetary gears 430 shown in FIG. 4 so that turbine 164 may transfer torque to planetary gear set 201B. Motor/generator 220 is shown mechanically coupled to ring gear 440 shown in FIG. 4 so that motor/generator 220 may receive power from turbine 164 when turbine 164 is operated as a turbine engine. Motor/generator 220 may provide torque to ring gear 440 to provide torque to planetary gear set 201B. Motor/generator 220 is also shown in electrical communication with electric energy storage device 210.

A second motor/generator 202 is shown mechanically coupled to planetary gear set 201B at sun gear 402 shown in FIG. 4 so that torque from second motor/generator 202 may be supplied to planetary gear set 201B. Second motor/generator 202 is in electrical communication with electric storage device 210. Motor/generator 202 may provide torque to planetary gear 402 to provide torque to planetary gear set 201B. Traction motor 250 is shown mechanically coupled to powertrain 200B and planetary gear set 201B via gear set 290. Traction motor 250 is also in electrical communication with electric storage device 210. Planetary gear set 201B and traction motor 250 deliver torque to vehicle wheels via shaft 231. Thus, planetary gear set 201B allows piston engine 10, turbine engine 164, first motor/generator 220, and second motor/generator 202 to be mechanically coupled without clutches. However, in some examples at least one of the motor/generators may be selectively clutched to powertrain 200B. In addition, although turbine torque may be transferred through gears 430 of FIG. 4 and piston torque is transferred via gear set 404, it is also possible to provide turbine torque through gears 430 and piston torque through gear set 404.

Referring now to FIG. 3, a plan view of an example planetary gear set 201A is shown. A first outer ring gear 310 including outer teeth 320 and inner teeth 322 encircles a plurality of planetary gears 304 and sun gear 302. Ring gear 310 may rotate while sun gear 302 is stationary. Conversely, sun gear 302 may rotate while ring gear 310 is held stationary. First outer ring gear 310 mechanically engages second ring gear 370 via teeth 320 and 380 so that torque may be transferred between first outer ring gear 310 and second outer ring gear 370.

A second outer ring gear 370 including outer teeth 380 and inner teeth 382 encircles a plurality of planetary gears 362 and sun gear 360. Ring gear 370 may rotate while sun gear 360 is stationary. Conversely, sun gear 360 may rotate while ring gear 370 is held stationary. Gear 350 transfers torque directly from planetary gear set 201A to the hybrid vehicle powertrain traction motor and wheels.

It should also be noted that the diameter of first outer ring gear 310 may be larger or smaller than the diameter of second outer ring gear 370.

As discussed with and shown in FIG. 2A, planetary gears 304 are directly coupled to turbine engine 164. First sun gear 302 is directly mechanically coupled a first generator and second sun gear is directly mechanically coupled to a second generator. Planetary gears 362 are directly mechanically coupled to piston engine 10 of FIG. 1.

Referring now to FIG. 4, a plan view of another example planetary gear set 201B is shown. A first outer ring gear 410 including outer teeth 412 and inner teeth 414 encircles a plurality of planetary gears 404 and sun gear 402. Ring gear 410 may rotate while sun gear 402 is stationary. Conversely, sun gear 402 may rotate while ring gear 410 is held stationary. First outer ring gear 410 mechanically engages a second set of planetary gears 430 via outer teeth 412 so that torque may be transferred between first outer ring gear 410 and the second group of planetary gears 430.

A second outer ring gear 440 including outer teeth 442 and inner teeth 444 encircles the planetary gears 430, first ring gear 410, the planetary gears 404, and sun gear 402. Torque is transferred from planetary gear set 201B to the hybrid vehicle powertrain traction motor and vehicle wheels via gear 420.

As discussed with and shown in FIG. 2B, planetary gears 404 are directly coupled to piston engine 10. First sun gear 402 is directly mechanically coupled to a second generator. Planetary gears 430 are directly mechanically coupled to turbine generator 164 shown in FIG. 1. Second outer ring gear 440 is directly mechanically coupled to a first generator.

Thus, the system of FIGS. 1-4 provides for a hybrid vehicle powertrain, comprising: an engine; an electric machine; a turbine generator located along an exhaust passage of the engine; and a planetary gear set mechanically coupled to the engine, the electric machine, and the turbine generator. The hybrid vehicle powertrain includes where the planetary gear set includes two sun gears and two ring gears. The hybrid vehicle powertrain includes where the planetary gear set includes an actual total number of one sun gear and two ring gears. The hybrid vehicle powertrain further comprises a gear mechanically linking vehicle wheels to a ring gear of the planetary gear set. The hybrid vehicle powertrain includes where the electric machine is a traction motor, and further comprising a first generator, the generator mechanically coupled to the planetary gear set. The hybrid vehicle powertrain further comprises a second generator, the second generator mechanically coupled to the planetary gear set. The hybrid vehicle powertrain further comprises a fuel source and an ignition source positioned along the exhaust passage upstream of the turbine generator.

The system of FIGS. 1-4 also provides for a hybrid vehicle powertrain, comprising: an engine; an electric machine; a turbine generator located along an exhaust passage of the engine; and a planetary gear set mechanically coupled to the engine, the electric machine, and the turbine generator, the planetary gear set including at least one sun gear and two ring gears. The hybrid vehicle powertrain further comprises a second sun gear. The hybrid vehicle powertrain includes where a first of the two ring gears is in direct mechanical contact with a second of the two ring gears. The hybrid vehicle powertrain includes where a first of the two ring gears is not in mechanical contact with a second of the two ring gears. The hybrid vehicle powertrain includes where the first ring gear is encircled by the second ring gear. The hybrid vehicle powertrain further comprises a plurality of planetary gears. The hybrid vehicle powertrain includes where the at least a portion of the plurality of planetary gears are in direct mechanical contact with the two ring gears.

Referring now to FIG. 5, a method for operating a vehicle powertrain is shown. The method of FIG. 5 may be included in the systems of FIGS. 1-4 as executable instructions stored in non-transitory memory. Further, portions of the method of FIG. 5 may be actions taken by controller 12 in the physical world to transform vehicle operating conditions.

At 502, method 500 determines vehicle operating conditions. Vehicle operating conditions may include but are not limited to vehicle speed, driver demand torque, battery state of charge, engine speed, engine load, engine fuel amount, and engine air amount, traction motor speed, first generator speed, and second generator speed. Vehicle operating conditions may be determined via a controller receiving data from vehicle sensors and actuators. Method 500 proceeds to 504 after operating conditions are determined.

At 504, method 500 determines a desired powertrain torque. In one example, the desired powertrain torque is a desire wheel torque. Further, the desired powertrain torque may include torque to operate one or two generators to charge the electric energy storage device. In other examples, the desired powertrain torque is an amount of torque output of the planetary gear set (e.g., 201A or 201B as shown in FIGS. 2A and 2B). The desired powertrain torque may be based off of a driver demand torque, and the driver demand torque is based on accelerator pedal position and vehicle speed. For example, it may be determined that a powertrain torque of 40 N-m is to be input into a planetary gear set to propel the vehicle based on a table or function that is indexed via vehicle speed and accelerator pedal position. Method 500 proceeds to 506 after the desired powertrain torque is determined.

At 506, method 500 judges if the desired powertrain torque may be met by only the traction motor. The traction motor torque may be a function of battery state of charge and traction motor speed. In one example, battery state of charge and fraction motor speed are used to index a table or function that outputs a value of maximum traction motor torque given the present traction motor speed and battery state of charge. If the desired powertrain torque may be met by only the traction motor, the answer is yes and method 500 proceeds to 508. Otherwise, the answer is no and method 500 proceeds to 510.

At 508, method 500 operates the traction motor as the sole source of positive torque being delivered to the powertrain to propel the vehicle. The traction motor may be supplied voltage and current that provides the desired powertrain torque via energy storage device 210 shown in FIG. 2A. The traction motor supplies torque to vehicle wheels and method 500 exits.

At 510, method 500 judges if the desired powertrain torque may be met by only the traction motor and the turbine engine (e.g., turbine 164). The traction motor torque may be a function of battery state of charge and traction motor speed while the traction motor torque may be a function of an amount of air and fuel supplied to the turbine engine. In one example, battery state of charge and traction motor speed are used to index a table or function that outputs a value of maximum traction motor torque given the present traction motor speed and battery state of charge. Likewise, a maximum air flow and fuel flow for the present turbine operating conditions may be used to index a table or function that outputs maximum turbine engine torque. If the desired powertrain torque may be met by only the traction motor and the turbine engine, the answer is yes and method 500 proceeds to 512. Otherwise, the answer is no and method 500 proceeds to 514.

At 512, method 500 deactivates the piston engine and activates the traction motor and the turbine engine. The piston engine may be deactivated by stopping fuel flow and spark to the piston engine. Further, the turbine engine may be activated by allowing fuel and air flow in the engine exhaust system upstream of the turbine engine. The air-fuel mixture in the engine exhaust system may be combusted via spark from a spark plug. The traction motor is activated by allowing voltage and current from the electric energy storage device to the traction motor. The traction motor and the turbine engine are commanded to two torque levels that when added provide the desired powertrain torque at the output of the planetary gear set or at the vehicle wheels. Torque is provided to the powertrain via transferring turbine torque through a planetary gear set as shown in FIGS. 2A and 2B. Method 500 proceeds to exit after the traction motor and turbine engine provide the desired powertrain torque.

At 514, method 500 starts and activates the piston engine. The piston engine is combusting air and fuel when activated. Further, the engine may provide positive torque to the powertrain when activated.

At 516, method 500 judges if the desired powertrain torque may be met by only the traction motor and the piston engine. The traction motor torque may be a function of battery state of charge and traction motor speed while the powertrain torque may be a function of an amount of air and fuel supplied to the turbine engine. In one example, battery state of charge and traction motor speed are used to index a table or function that outputs a value of maximum traction motor torque given the present traction motor speed and battery state of charge. Similarly, a maximum air flow and fuel flow for the present engine speed may be used to index a table or function that outputs maximum piston engine torque. If the desired powertrain torque may be met by only the traction motor and the piston engine, the answer is yes and method 500 proceeds to 520. Otherwise, the answer is no and method 500 proceeds to 518.

At 520, method 500 selectively operates the traction motor to augment piston engine torque in response to desired powertrain torque. If the desired powertrain torque is not a maximum value, only the piston engine may be activated. If the desired powertrain torque is a higher value, both the engine and the traction motor may provide torque to the powertrain. The turbine generator is deactivated by ceasing air and fuel flow to the turbine generator. The piston engine torque and traction motor each provide a portion of the desired powertrain torque such that when the piston engine torque is added to the traction motor torque, the result is the desired powertrain torque. The piston engine torque is input to the planetary gear set. Method 500 proceeds to exit after the traction motor and piston engine provide the desired powertrain torque.

At 518, method 500 activates the traction motor and the turbine engine so that the piston engine, turbine engine, and traction motor are active. The turbine engine, piston engine, and traction motor each provide at least a portion of the desired powertrain torque. The piston engine torque, turbine engine torque, and traction motor torque add to the desired powertrain torque. The piston engine torque and turbine engine torque are input to the planetary gear set and then combined with the traction motor torque to provide the desired powertrain torque. Method 500 proceeds to exit after the desired powertrain torque is provided.

The method of FIG. 5 provides for a hybrid vehicle powertrain operating method, comprising: combining torque of an electric machine, a piston engine, and a turbine engine positioned along an exhaust passage of the piston engine in a planetary gear set; and transferring torque from the planetary gear set to vehicle wheels. The hybrid vehicle operating method further comprises receiving input from a sensor to a controller, and selectively activating one or more of the electric machine, the piston engine, and the turbine generator in response to the input from the sensor. The hybrid vehicle operating method includes where the electric machine is directly mechanically coupled to a ring gear of the planetary gear set. The hybrid vehicle operating method includes where the piston engine is directly mechanically coupled to planetary gears of the planetary gear set. The hybrid vehicle operating method includes where the turbine engine is directly mechanically coupled to planetary gears of the planetary gear set. The hybrid vehicle operating method further comprises selectively activating and deactivating the electric machine, the piston engine, and the turbine engine responsive to a driver demand torque.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A hybrid vehicle powertrain, comprising:
an engine;
an electric machine;
a turbine generator located along an exhaust passage of the engine; and
a planetary gear set mechanically coupled to the engine, the electric machine, and the turbine generator;
where the electric machine is a traction motor, and further comprising a first generator, the first generator mechanically coupled to the planetary gear set.

2. The hybrid vehicle powertrain of claim 1, where the planetary gear set includes two sun gears and two ring gears.

3. The hybrid vehicle powertrain of claim 1, where the planetary gear set includes an actual total number of one sun gear and two ring gears.

4. The hybrid vehicle powertrain of claim 1, further comprising a gear mechanically linking vehicle wheels to a ring gear of the planetary gear set.

5. The hybrid vehicle powertrain of claim 1, further comprising a second generator, the second generator mechanically coupled to the planetary gear set.

6. The hybrid vehicle powertrain of claim 1, further comprising a fuel source and an ignition source positioned along the exhaust passage upstream of the turbine generator.

7. A hybrid vehicle powertrain, comprising:
an engine;
an electric machine;
a turbine generator located along an exhaust passage of the engine; and
a planetary gear set mechanically coupled to the engine, the electric machine, and the turbine generator, the planetary gear set including at least one sun gear and two ring gears.

8. The hybrid vehicle powertrain of claim 7, further comprising a second sun gear.

9. The hybrid vehicle powertrain of claim 7, where a first of the two ring gears is in direct mechanical contact with a second of the two ring gears.

10. The hybrid vehicle powertrain of claim 7, where a first of the two ring gears is not in mechanical contact with a second of the two ring gears.

11. The hybrid vehicle powertrain of claim 10, where the first ring gear is encircled by the second ring gear.

12. The hybrid vehicle powertrain of claim 7, further comprising a plurality of planetary gears.

13. The hybrid vehicle powertrain of claim 12, where at least a portion of the plurality of planetary gears is in direct mechanical contact with the two ring gears.

14. A hybrid vehicle powertrain operating method, comprising:
combining torque of an electric machine, a piston engine, and a turbine engine positioned along an exhaust passage of the piston engine in a planetary gear set;
transferring torque from the planetary gear set to vehicle wheels; and
receiving input from a sensor to a controller, and selectively activating one or more of the electric machine, the piston engine, and the turbine engine in response to the input from the sensor, where the electric machine is directly mechanically coupled to a ring gear of the planetary gear set.

15. The hybrid vehicle powertrain operating method of claim 14, where the piston engine is directly mechanically coupled to planetary gears of the planetary gear set.

16. The hybrid vehicle powertrain operating method of claim 15, where the turbine engine is directly mechanically coupled to the planetary gears of the planetary gear set.

17. The hybrid vehicle powertrain operating method of claim 16, further comprising selectively activating and deactivating the electric machine, the piston engine, and the turbine engine responsive to a driver demand torque.

* * * * *